May 2, 1967

B. J. PATTON ETAL 3,317,821

LOGGING SYSTEM INCLUDING ELECTRICAL COIL SUPPORTED
WITHOUT ROTATION FOR MEASURING SUBSURFACE
FORMATION MAGNETIC FIELD GRADIENTS

Filed Feb. 6, 1964

BOBBIE J. PATTON
JOHN L. FITCH
INVENTORS

BY *Arthur F. Zobal*

ATTORNEY 3,317,821
LOGGING SYSTEM INCLUDING ELECTRICAL COIL SUPPORTED WITHOUT ROTATION FOR MEASURING SUBSURFACE FORMATION MAGNETIC FIELD GRADIENTS
Bobbie J. Patton and John L. Fitch, Dallas, Tex., assignors to Mobil Oil Corporation, a corporation of New York
Filed Feb. 6, 1964, Ser. No. 343,003
3 Claims. (Cl. 324—8)

This invention relates to the logging of magnetic properties of formations traversed by a borehole and has for an object the provision of a logging system comprising an arrangement for traversing a borehole with an electrical coil supported without rotational movement and in an environment substantially free from ferromagnetic material to induce a voltage in the coil primarily representative of variations of magnetic field in the borehole.

In well logging, the remanent magnetic field, or the magnetic field, due to the remanent magnetism of rock formations is of interest, for example, since it gives information about boundary conditions of the various formations. Attempts have been made to measure variations of the remanent magnetic field in a borehole to obtain information about the formations; however, the techniques which have been employed are based upon measurements made of the total magnetic field. For example, in one technique, measurements are made of the total field at two spaced points along the axis of a borehole and the difference formed to obtain information about the remanent magnetic field. Difficulties have been encountered in this approach in part due to the fact that the earth's magnetic field is significantly larger than the remanent field. For example, the earth's field strength is of the order of 0.5 oersted while the remanent field strength is the order of $10^{-4}$ oersted or less. The above technique thus involves subtracting two very large quantities from each other to obtain a very small quantity. Thus, extremely high accuracy of measurements of the two large quantities is required in order that the difference be meaningful. The accuracy required in measuring the field strength to obtain the desired information is difficult if not impossible to achieve, especially in a borehole.

In accordance with the present invention, there is provided an improved system for measuring variations of the remanent magnetic field in a borehole. The system comprises a logging means for traversing the borehole and includes at least one electrical coil for sensing the magnetic field gradient resulting from the remanent magnetism of the formations. Means including a gyroscopic means is provided to support the coil without rotational movement. The logging means is substantially free of ferromangetic material at least in the vicinity of the coil. The coil is supported in the logging means such that the axis passing through the center thereof is substantially vertical. In addition, means is provided for moving the coil in a substantially vertical direction in the borehole to induce a voltage in the coil primarily representative of a component of the magnetic field gradient in the borehole and resulting from the remanent magnetism of the formations. By employing the system of the present invention, the effect of the earth's field is substantially reduced thereby allowing a measure to be obtained of the remanent magnetic field gradient.

More particularly, the earth's field is due to sources inside the earth which are at a great distance from the region of interest. Thus, the earth's field at the earth's surface or in a borehole is relatively uniform; that is, changes in the field over the relatively short distances of interest are small compared with the field strength. On the other hand, the remanent magnetc field in a borehole is due to nearby sources (the rock formations adjacent the borehole). Moreover, in many instances, the remanent magnetization changes abruptly from one earth formation to another thereby producing relatively large gradients in the borehole compared with the gradient of the earth's field. By moving a coil in the borehole without rotational movement, a voltage will be induced in the coil which is a measure only of the changes in the magnetic field. Since the earth's field is substantially uniform, the voltage induced is a measure primarily of the changes in the remanent magnetic field.

For further objects and advantages of the present invention and for a more complete understanding thereof, reference may be had now to the following detailed description taken in conjunction with the accompanying drawings wherein.

Figure 1:
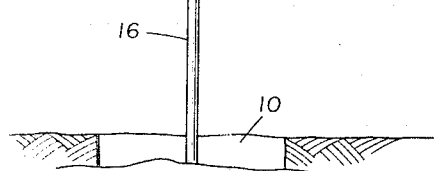
FIGURE 1 illustrates a borehole unit employing the system of the present invention.

Referring now to FIGURE 1, there will be described the present invention for measuring variations of the remanent magnetic field in an uncased borehole 10. In carrying out the method of one embodiment, a coil 11, provided in a borehole unit 12, is moved along a given path in the borehole with translatory motion (without rotation). The output of the coil is applied to the surface to a recorder 13 which records a trace 14 in correlation with depth and representative of a component of the remanent magnetic field gradient in the borehole. More particularly, by moving the coil in the borehole without rotation a voltage is induced in the coil which is proportional to the rate of change of the magnetic flux through the coil. The rate of change of magnetic flux is proportional to the product of the speed of translation of the coil and a component of the magnetic field gradient. Since the earth's magnetic field is relatively uniform, the voltage induced will be representative of changes in the local magnetic field.

In one embodiment, the means for giving the coil translation includes a gyroscope arrangement 15 for supporting the coil without rotation and means for continuously moving the coil 11 along the borehole. This last means includes cable 16 coupled to unit 12 and wound and unwound upon drum 17 which is driven by motor 18 and mechanical connection 19. For a single coil, the axis of the coil passing through the center thereof preferably is maintained in the $z$ (vertical) direction while the unit 12 is moved along the borehole. Thus in the system of FIGURE 1, the coil illustrated measures the vertical component of the magnetic field gradient in the vertical direction. Other components, however, can be measured with the coil or with a plurality of coils as will be described hereinafter.

In the system illustrated in FIGURE 1, the voltage induced in the coil may be expressed by the following relationship:

$$e_T = 10^{-8} N a \frac{\partial H_z}{\partial_z} \frac{dz}{dt}$$

wherein:

$e_T$ is the voltage due to translation in the $z$ direction,
N is equal to the turns of the coil,
$a$ is the area of the coil normal to $z$,
$\partial H/\partial z$ is the spatial partial derivative of the $z$ component of the magnetic field with respect to $z$, and
$dz/dt$ is the speed of the coil in the $z$ direction.

The single coil signal may be used to detect bed boundaries because such boundaries will normally show a sharp gradient response due to a change in magnetization from bed to bed. More particularly, referring to FIGURE 2, trace 20 illustrates the signal from a single coil with its axis in the vertical or $z$ direction and translated in the vertical or $z$ direction along formations A–D. This trace thus is the partial derivative of the vertical component of the borehole magnetic field with respect to the vertical direction. The $z$ component of the formation magnetization is indicated on the left of FIGURE 2 where the direction of the arrows indicates the direction of magnetization and the length of arrows indicates the intensity of magnetization. The $z$ component of the magnetic field due to the magnetization of the formations also is illustrated by trace 21. The vertical portions of trace 21 represent uniform magnetic fields of different strength and the sloping portions of the trace represent magnetic field gradients. The sign reflects the direction of the magnetic field. As illustrated, trace 20 reflects only changes in the magnetic field, the sign of each variation reflecting the direction of change and magnitude of each variation being proportional to the rate of change of the field.

Referring again to FIGURE 1, there will be described in more detail the system illustrated. The coil 11 is supported in a housing 22 which is stabilized by the gyroscopic stabilizer system 15. Supports 23 and 24 are provided respectively for supporting coil 11 and gyroscope 15 in the housing. The housing 22 is supported in unit 12 by a bracket 25 and bearing 26 which allow free movement of the housing in any direction within sufficient limits except in the $z$ direction.

The coil is supported without rotation preferably about any axis; however, the coil may be allowed to rotate about the axis passing through the center of the coil (the $z$ axis in the illustration disclosed) without affecting the measurements desired. More particularly, considering only the earth's field which is substantially uniform, rotation of the coil about the axis passing through the center thereof will result in substantially no change in the total magnetic flux through the coil. The earth's field thus will not be reflected by such rotation. On the other hand, again considering only the earth's field, rotation of the coil about any other axis will result in a change in the total magnetic flux through the coil. Rotation of this nature thus will induce a voltage in the coil which is proportional to the speed of rotation and the earth's magnetic field. This type of rotation thus is to be avoided.

It is also desirable to construct the borehole unit including the instrumentation of nonferromagnetic material since the presence of ferromagnetic material will distort the magnetic field in the borehole. Distortion of the magnetic field, at least in the vicinity of the coil, will result in erroneous measurements of the gradient of the field of interest. The unit 12 and housing 22, at least adjacent the coil 11, may be of aluminum. In addition, the support structure for the coil is of nonferromagnetic material such as aluminum.

Referring now to other components of the system, the signals from coil 11 are applied to the surface by way of conductors 27, slip ring 28, amplifier 29, and conductors 30 of cable 16. At the surface, signals from conductors 30 are applied to the recorder 13 by slip ring 31 and brush 32 which are part of a plurality of slip rings and brushes and, in addition, by way of amplifier 33. The chart of the recorder 13 is driven in correlation with depth by a sheave 34 and mechanical connection 35. Power is supplied downhole to the gyroscope by way of surface power supply 36, slip rings and brushes (not shown), conductors 37 of cable 16, borehole power supply 38, slip ring 28, and conductors 39.

Figure 3:
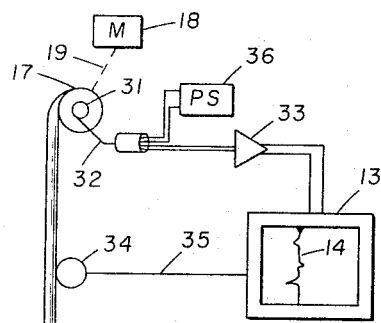
FIGURE 3 illustrates a modification of a system of FIGURE 1.

In an alternative embodiment, the gyroscopic arrangement may be eliminated by employing two substantially identical coils 40 and 41 connected in series opposition, as illustrated in FIGURE 3. Upon movement of the coils along the borehole, a resultant signal is produced which is representative primarily of the difference in the magnetic field gradient as measured by each coil. More particularly, the two coils are supported in the unit 12 by supports, illustrated by dotted lines 42, to prevent rotation of the coils relative to the unit 12 and to each other and further are supported such that the axes of the coils passing through the center are parallel with the longitudinal axis of the unit 12. With this arrangement, the axes of the coils through the center thereof will be in the $z$ direction when the unit is supported in the borehole. Rotation or movement of the coils about any other axis will be at a minimum since the unit 12 is elongated and generally will have a diameter only slightly smaller than the diameter of the borehole. Thus, the rotational signal of each coil is minimized and the resultant rotational signal of both coils approaches zero, thereby allowing the signal of interest to be measured.

Figure 2:
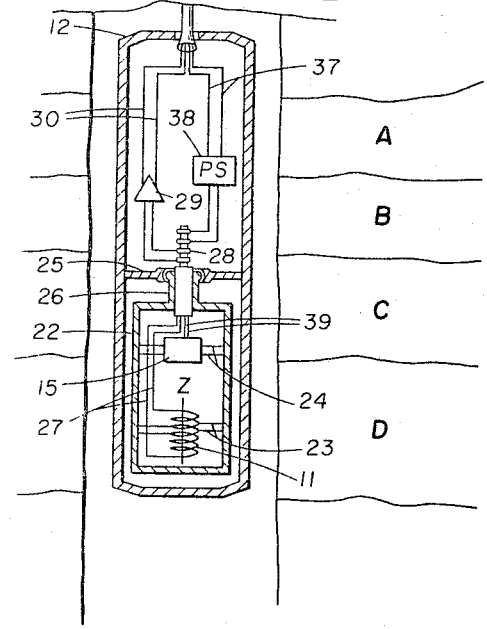
FIGURE 2 illustrates traces useful in understanding the present invention.
Figure 2:
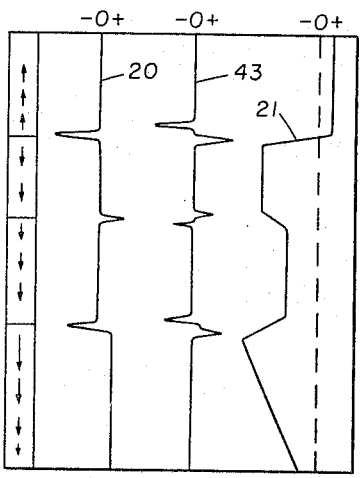

More particularly, upon vertical movement of the coils along the borehole, signals of different magnitudes will be induced in each coil due to the gradient of the local field. A resultant signal thus will be produced and which will be representative primarily of the difference in the local magnetic field gradient as measured by each coil. The resultant signal, however, can employed to differentiate or distinguish boundaries. More particularly, trace 43 of FIGURE 2 illustrates the signal from a bucking coil pair with the coil axes in a $z$ direction and translated in the $z$ direction. The character of this trace depends upon the spacing between the coils. This spacing may be varied to achieve the desired results and in one embodiment may be of the order of two feet.

There now will be described other embodiments of the present invention. In some instances it may be desirable to measure the $x$ or $y$ component of the magnetic field gradient to obtain information not disclosed by the $z$ component. In the system of FIGURE 1, the $x$ or $y$ component of the magnetic field gradient in the $z$ direction can be measured by maintaining the axis of a coil in the $x$ or $y$ directions. In a further alternative, the $x$, $y$, and $z$ components of the magnetic field gradient in the $z$ direction can be measured simultaneously by mounting in the housing 22 three coils whose axes extend respectively in the $x$, $y$, and $z$ directions. The signals from the three coils may be applied to the surface to three recorders, each similar to recorder 13 to record three continuous traces which provide information of interest, for example, on boundary conditions.

Figure 4:
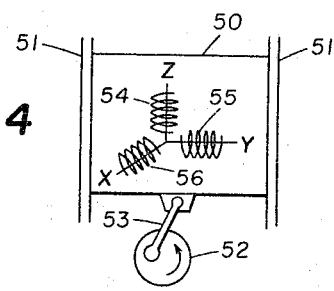
FIGURE 4 illustrates further modifications of the system of FIGURE 1.

In another embodiment, the system of FIGURE 4 can be employed to impart translatory motion to one or more coils by reciprocation. With this arrangement, a higher velocity can be obtained, thereby resulting in the production of a larger signal. The coil or coils are mounted on slideable support 50 which is guided along rails 51 and is reciprocated by means of crank 52 and connecting rod 53. The assembly may be mounted within housing 22 in order to support the coil or coils, including rails 51 without rotation. In the system illustrated in FIGURE 4, three coils 54–56 are shown mounted on support 50.

The system of FIGURE 4 also has advantages in that it may be employed to measure one or more components of the magnetic field gradient in the $x$, $y$, or $z$ directions. More particularly, this can be carried out by arranging the system such that the coil mounting means 50 can be reciprocated in the $x$, $y$, or $z$ directions.

Now that the invention has been described, modifications will become apparent to those skilled in the art and it is intended to cover such modifications as fall within the scope of the appended claims.

What is claimed:
1. A system for measuring the magnetic field gradient resulting from the magnetism of subsurface formations traversed by a borehole comprising:
    a logging means for traversing said borehole and in- cluding at least one electrical coil for sensing for the magnetic field gradient resulting from the magnetism of the formations, means including gyroscopic means for supporting said coil without rotational movement, said borehole being free of artificially introduced magnetic material having magnetic properties which would otherwise cause substantial interference with said sensing operation, said logging means environment at least in the vicinity of said coil being substantially free of ferromagnetic material, said coil being supported such that the axis passing through the center thereof is substantially vertical, said system including only passive electromagnetic field exploratory means for sensing only for the naturally occurring magnetic field gradient in said borehole, and means for moving said coil in a substantially vertical direction in said borehole to induce a voltage in said coil primarily representative of a component of the magnetic field gradient in said borehole and resulting from the magnetism of the formations.

2. The system of claim 1 wherein:

said last-named means comprises means for continuously moving said logging means through said borehole.

3. The system of claim 1 wherein:

said last-named means comprises means for reciprocating said coil independently of motion of said logging means.

References Cited by the Examiner

UNITED STATES PATENTS

| | | | |
|---|---|---|---|
| 2,196,314 | 4/1940 | Lee | 324—8 |
| 2,297,568 | 9/1942 | Leonardon | 324—8 X |
| 2,359,894 | 10/1944 | Brown et al. | 324—8 |
| 2,401,280 | 5/1946 | Walstrom | 324—8 |
| 2,664,542 | 12/1953 | Lynn | 324—8 |
| 2,716,730 | 8/1955 | Williams | 324—8 |
| 2,723,374 | 11/1955 | Williams | 324—8 X |
| 2,766,426 | 10/1956 | Wilhelm | 324—8 X |
| 3,136,943 | 6/1964 | Slichter | 324—7 |
| 3,187,252 | 6/1965 | Hungerford | 324—6 |

References Cited by the Applicant

UNITED STATES PATENTS

| | | |
|---|---|---|
| 2,124,825 | 7/1938 | Machts et al. |
| 2,238,072 | 4/1941 | Nelson et al. |
| 2,524,360 | 10/1950 | Russell. |
| 3,058,060 | 10/1962 | Thoburn. |

OTHER REFERENCES

Measurement of Magnetic Field Gradients, J. F. Frazer, et al., The Review of Scientific Instruments, volume 26, No. 5, May 1955, pp. 475–476.

WALTER L. CARLSON, *Primary Examiner.*

G. R. STRECKER, *Assistant Examiner.*